United States Patent [19]
Carr

[11] Patent Number: 4,928,216
[45] Date of Patent: May 22, 1990

[54] LIGHT MOUNT ASSEMBLY HAVING RAISED AND LOWERED POSITIONS

[75] Inventor: Jeff A. Carr, Downey, Calif.
[73] Assignee: Carr Pattern Co., Inc., South Gate, Calif.
[21] Appl. No.: 428,859
[22] Filed: Oct. 30, 1989
[51] Int. Cl.⁵ .......................... B60Q 1/06; F21V 3/18
[52] U.S. Cl. ...................................... 362/66; 362/80; 362/250
[58] Field of Search ................... 362/66, 80, 287, 250, 362/427

[56] References Cited

U.S. PATENT DOCUMENTS

| | | | |
|---|---|---|---|
| 3,460,728 | 12/1969 | Adamson | 362/80 X |
| 4,473,868 | 9/1984 | Moore | 362/427 X |
| 4,692,845 | 9/1987 | Widhalm et al. | 362/66 X |
| 4,707,014 | 11/1987 | Rich | 362/66 X |
| 4,722,030 | 1/1988 | Bowden | 362/287 X |

Primary Examiner—Allen M. Ostrager
Attorney, Agent, or Firm—Edward A. Sokolski

[57] ABSTRACT

An assembly for mounting lights across the top portion of a vehicle has a pair of brackets attached to the vehicle between which a mounting bar is supported. One or more lights are supported on the bar, such lights normally being held in a raised or upright position. The bar is supported on the brackets for limited pivotal adjustment relative thereto, there being a locking bolt which operates in conjunction with a locking plate for locking the mounting bar in either the raised position or a lowered position which is typically ninety degrees relative to the raised position. To facilitate rotation to the lowered position, a cutout is provided in each of the brackets into which a stop member formed on each of the brackets extends, the stop members abutting against projections formed in the cutouts to arrest travel of the bar when it has traveled to the lowered position. Thus, the lights can easily be brought to a lowered position such as may be required to permit the vehicle to pass into a garage.

8 Claims, 5 Drawing Sheets

LIGHT MOUNT ASSEMBLY HAVING RAISED AND LOWERED POSITIONS

BACKGROUND OF THE INVENTION

1. Field of the Invention

This invention relates to assemblies for mounting lights on a vehicle and more particularly to such an assembly which mounts on the top of a vehicle and has a vehicle mounting bar that can alternatively be set in either a raised or lowered position.

2. Description of the Prior Art

Various mounting assemblies are available in the prior art for use in mounting lights across the top of a vehicle. Such assemblies generally include a pair of mounting brackets which are attached to the opposite sides of the vehicle between which a mounting bar for the lights is supported. There is a problem with the mounting of lights in this fashion in that the effective height of the vehicle is increased so as to make it impossible to bring the vehicle into certain areas having limited height clearances, such as garages.

SUMMARY OF THE INVENTION

The present invention solves this problem by providing an assembly in which the effective height presented by the vehicle can be lowered by rotating the mounting bar supporting the lights to bring such lights to a horizontal position. This end result is achieved both simply and rapidly. At the same time firm support of the lights in both the raised and lowered positions is provided.

The assembly of the invention includes a pair of brackets which are mounted on opposite sides of the vehicle and a support bar which runs across the top of the vehicle between the brackets. The lights are mounted on the support bar and are in a normally upright position when the bar is in its raised position. The bar is mounted on the brackets for limited pivotal adjustment of ninety degrees in either direction from the upright position. Locking means is provided to alternatively lock the bar in either the "raised" or "lowered" positions. To facilitate the setting of position, a cutout is provided in the opposite ends of the bar, this cutout having a projection therein and into which cutout a stop member which protrudes from each of the brackets is respectively fitted. Thus, the bar is normally locked in the raised position to hold the lights upright, but when it is necessary to enter a low clearance area such as a garage, the locking means is released and the bar rotated ninety degrees in either direction until the stop members of the brackets abut against the corresponding projections of the bar to bring the lights to the lowered position. The locking means is then adjusted to lock the bar to the brackets.

It is therefore an object of this invention to provide a mounting assembly for mounting lights across the top of a vehicle with which the lights can be rotated to a lowered position to provide clearance for the vehicle.

Other objects of the invention as the description proceeds in connection with the accompanying drawings, of which:

Figure 1:
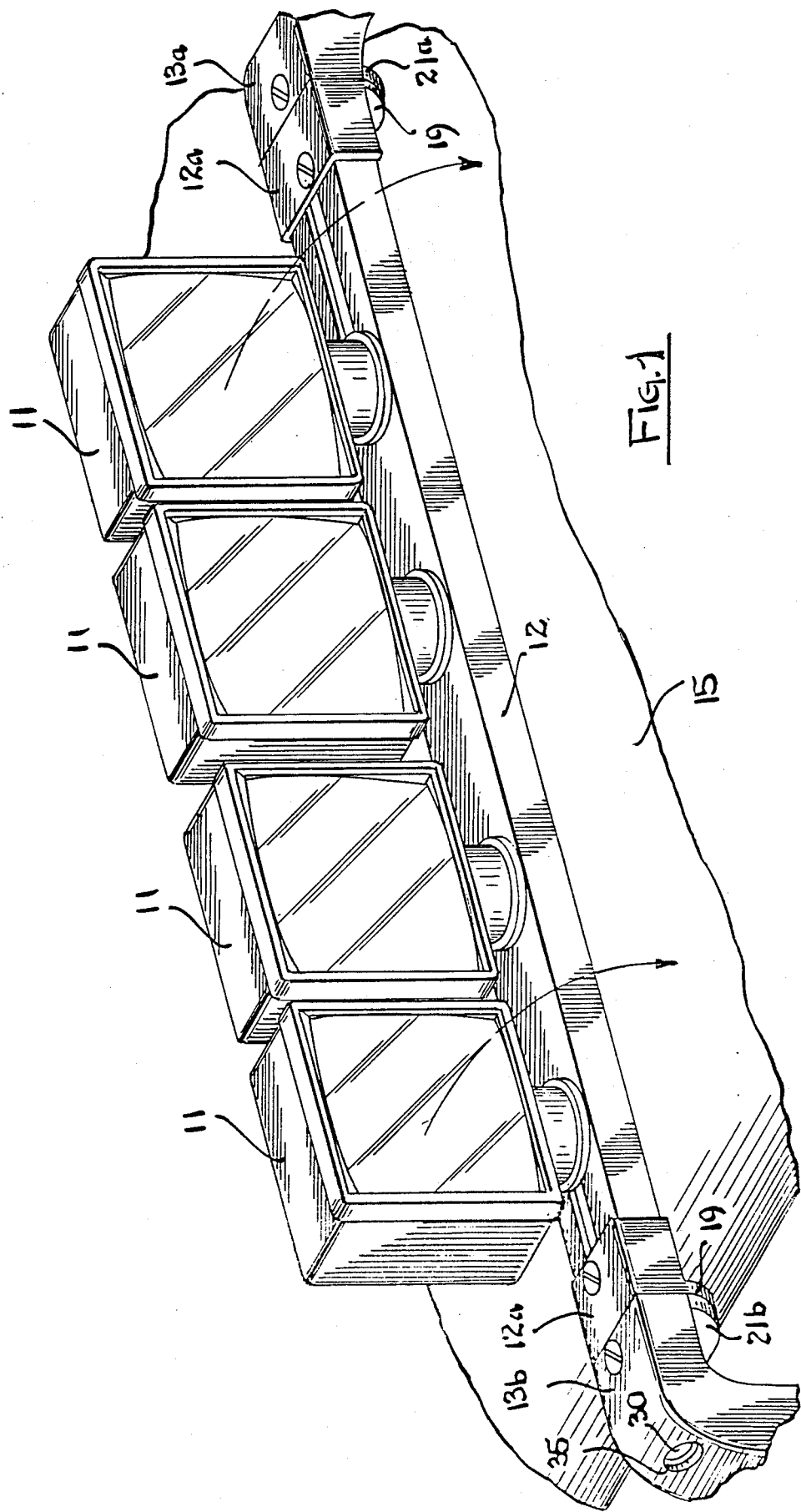
FIG. 1 is a front perspective view of a preferred embodiment of the invention.

Referring now to the FIGURES, a preferred embodiment of the invention is illustrated. A plurality of lights 11 are fixedly mounted on support bar 12 which is supported between a pair of similar brackets 13a and 13b. The brackets are attached to opposite sides of vehicle 15 with bar 12 extending over the top of such vehicle. Bar 12 has end plates 12a which are attached to the opposite ends thereof by means of bolts 17 and nuts 18, these end plates having arcuate upright portions 19. Each of upright portions 19 has an arcuate cutout 19a formed therein and a projection 19b which extends into the cutout.

Each of brackets 13a and 13b has an end plate 21 attached to the end thereof by means of a bolt 22 and nut 23. Each bracket has an upright portion 21a with a flat surface which abuts against an opposing surface of the upright portion 19 of the end plate 12a of bar 12. A stop member 21b extends from upright portion 19, this stop member having opposite surfaces 21c which engage opposing surfaces 19c of end plate 19 when the bar is rotated in either direction. The combined widths of stop member 21b and projection 19b are preferably made so as to allow 90 degrees of rotation from the "raised" position in either direction.

Figure 2:
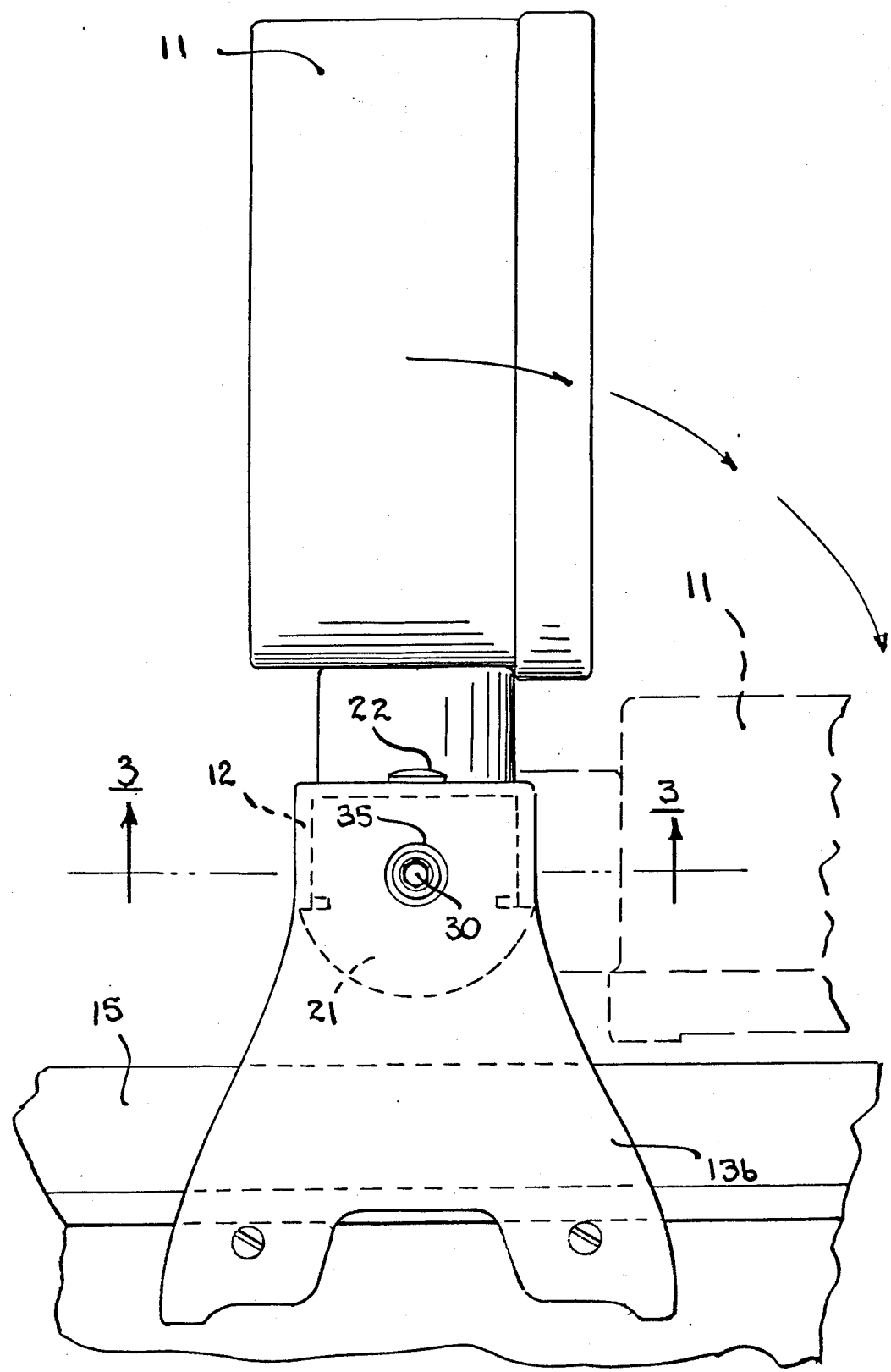
FIG. 2 is a side elevational view of the bracket of the embodiment of FIG. 1.
Figure 3:
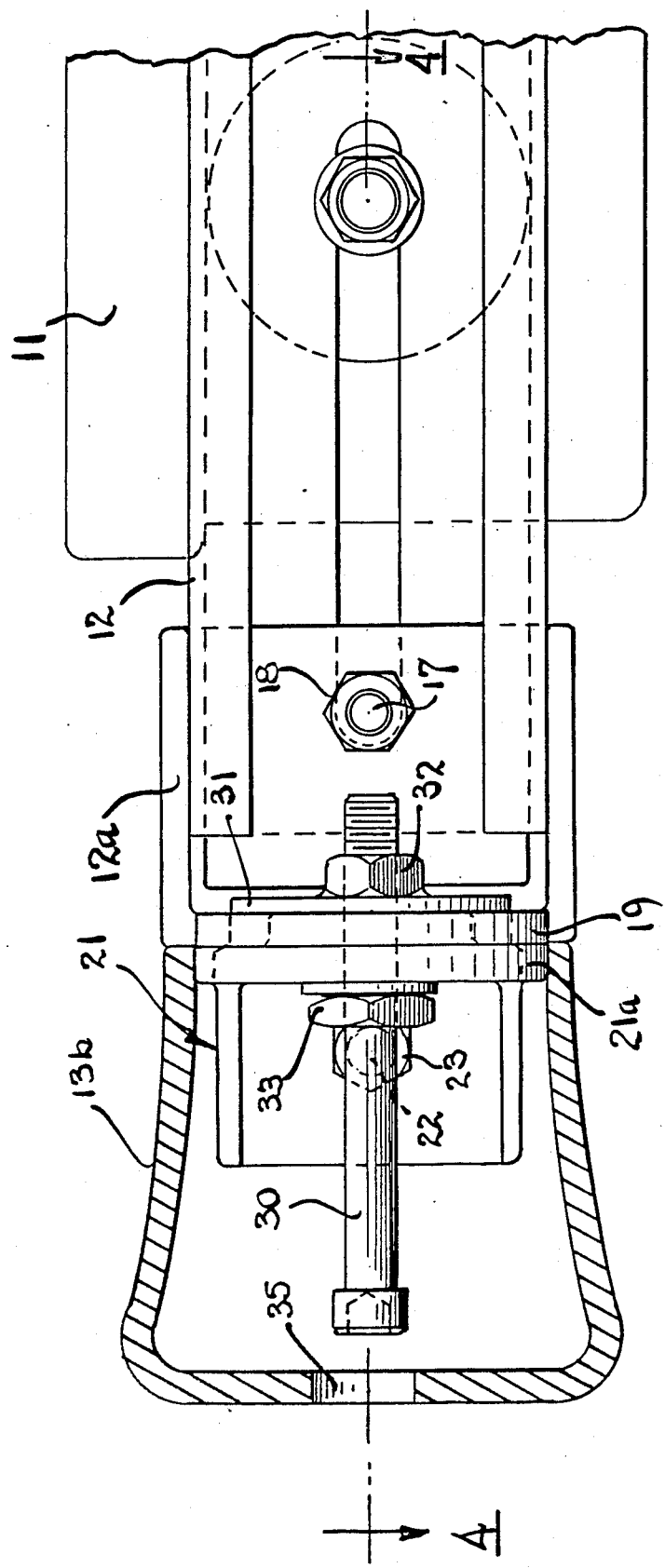
FIG. 3 is a cross sectional view taken along the plane indicated by 3—3 in FIG. 2.
Figure 4:
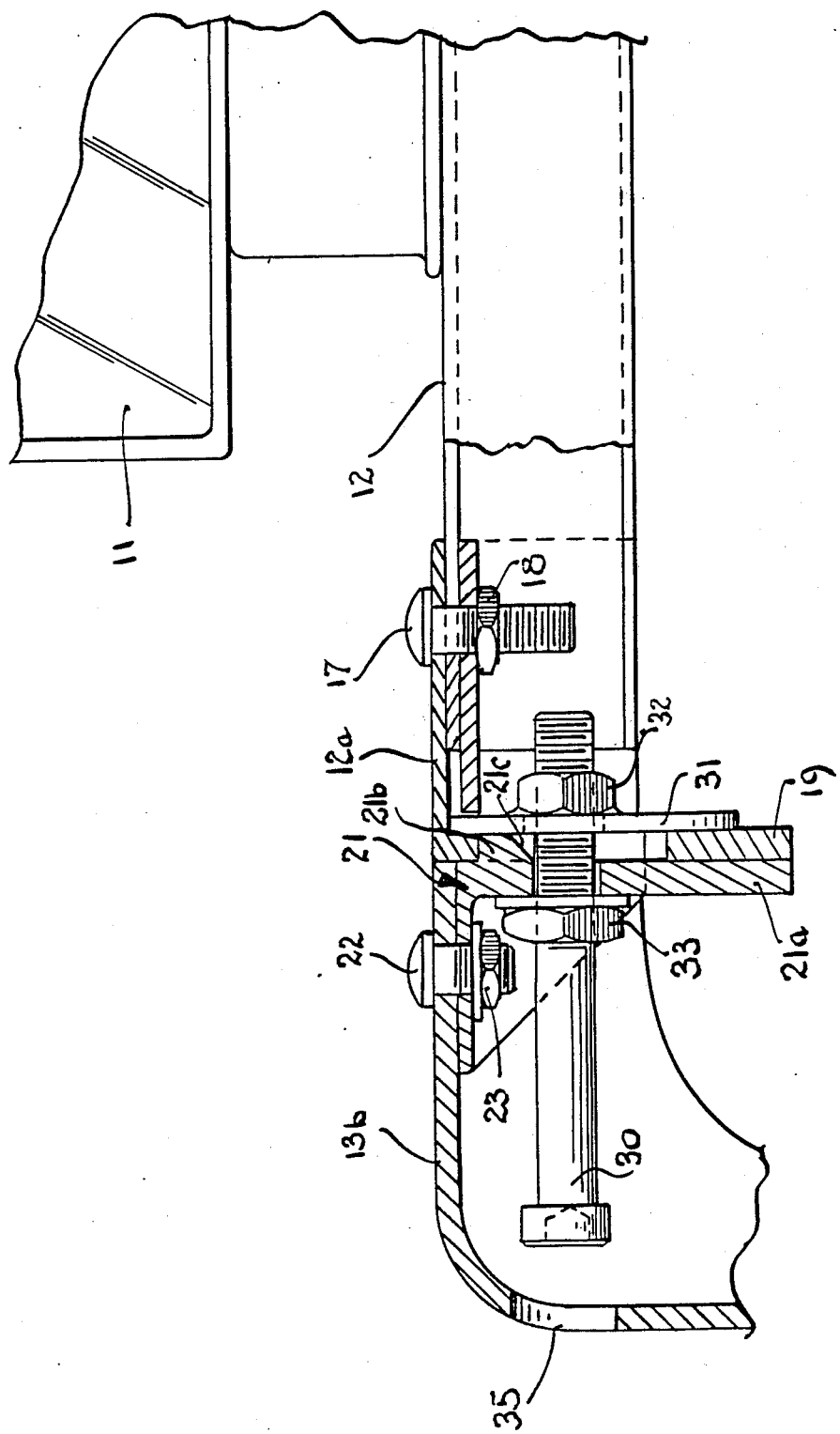
FIG. 4 is a cross sectional view taken along the plane indicated by 4—4 in FIG. 3.
Figure 5:
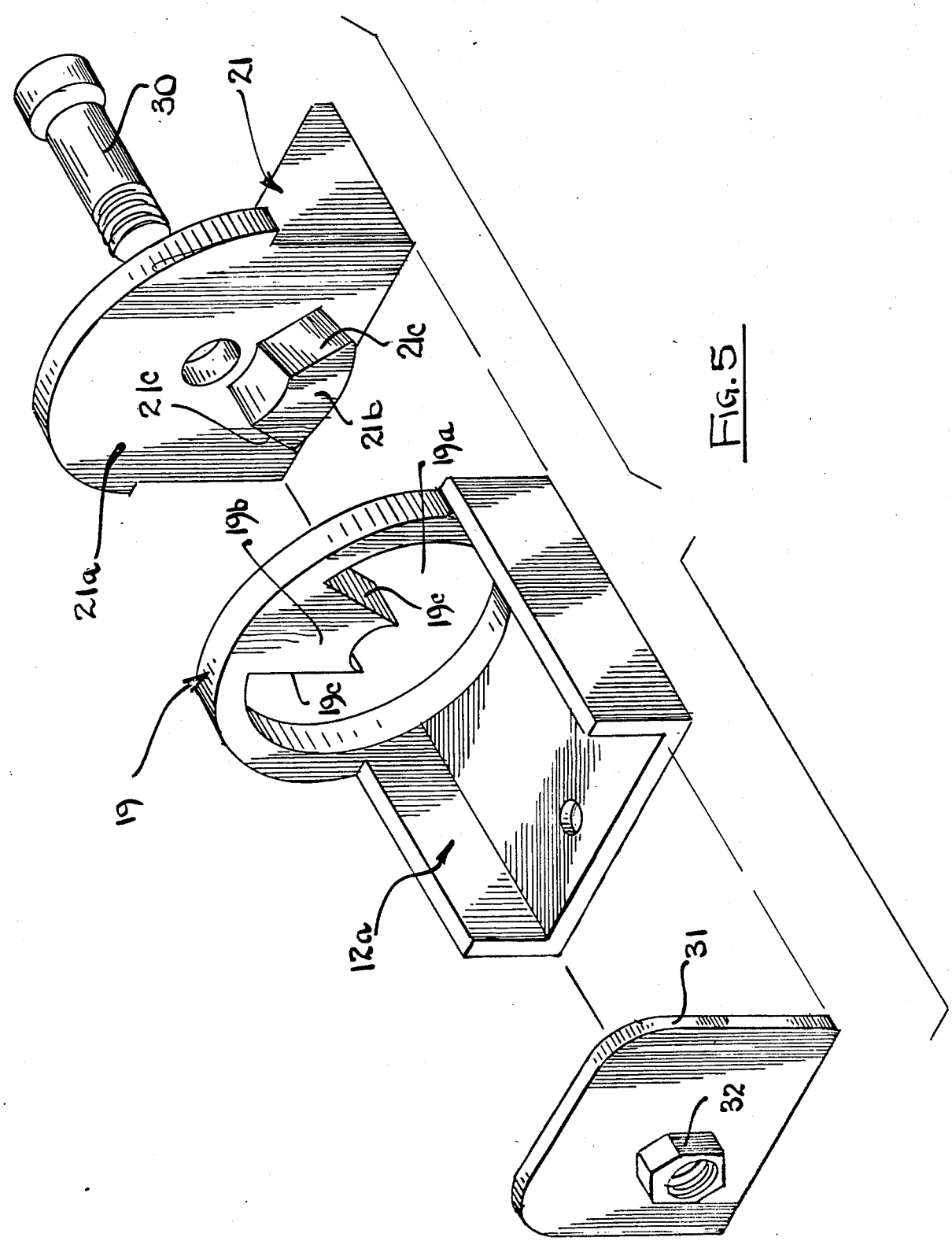
FIG. 5 is a perspective exploded view illustrating the rotation stop mechanism of the preferred embodiment.

Bar 12 is held firmly to brackets 13a and 13b in either the raised or lowered positions of lights 11 by means of bolts 30 operating in conjunction with nuts 33, washers 34 and apertured mounting plates 31 which have nuts 32 fixedly attached thereto as, for example, by welding. Thus, bolts 30 are tightened to firmly clamp the bar 12 to the brackets 13a and 13b to maintain lights 11 in the raised or upright position, as shown in FIGS. 1-4. When it is necessary to place the lights in a lowered position to provide clearance for the vehicle, bolts 30 are loosened to permit the clockwise or counterclockwise rotation of bar 12 (and the lights 11 mounted thereon) until the stop plates 21b abut against projections 19b, thereby bringing the lights to the lowered position, whereat bolts 30 are tightened to retain the bar and the lights in this position. In view of the fact that plates 31 are prevented from rotating by the walls of end plates 12a, the bolts 30 can readily be tightened and loosened by means of an appropriate screw driver or wrench inserted through apertures 35 formed in brackets 13a and 13b.

While the invention has been described and illustrated in detail, it is clearly to be understood that this is intended by way of illustration and example only and not to be taken by way of limitation, the scope of the invention being limited only by the terms of the following claims.

I claim:

1. An assembly for mounting one or more lights on a vehicle comprising:

a pair of mounting brackets attached to opposite sides of said vehicle, each of said brackets having a stop member extending therefrom;

a bar, said lights being mounted on said bar; and means for attaching the opposite ends of said bar to said brackets for pivotal adjustment relative thereto between predetermined raised and lowered positions of said lights, said bar having projections on both ends thereof which matingly engage the stop members of the brackets when the bar is in said lowered position.

2. The assembly of claim 1 wherein the lights are held upright by said attachment means in said raised position and substantially ninety degrees from said upright position in said lowered position.

3. The assembly of claim 1 wherein said bar runs across the top said vehicle.

4. The assembly of claim 1 wherein said attachment means comprises a threaded bolt and a mounting plate having a threaded aperture which said bolt matingly engages, each of the brackets having an end plate with an upright portion having a flat surface each of said stop members extending from a corresponding one of said flat surfaces, said bar having similar end plates at the opposite ends thereof, each of said bar end plates having an upright portion with a cutout formed therein, each of the projections of said bar forming an extension of one of said bar end plate upright portions which extends into a corresponding one of said cutouts, whereby when said bolts are tightened, the flat surfaces of said bracket end pieces are drawn against the bar upright portions.

5. The assembly of claim 4 wherein the combined widths of the stop members of each of said brackets and each of the projections of said bar are such as to permit ninety degrees of rotation of said bar in either direction from the raised position of said lights.

6. An assembly for mounting one or more lights on a vehicle comprising:

a pair of mounting brackets attached to opposite sides of said vehicle, each of said brackets having an end plate with an upright portion, each of said end plates having a flat surface from which a stop member extends, a bar on which said lights are mounted, said bar having similar end plates at the opposite ends thereof, each of said bar end plates having an upright portion with an arcuate cutout formed therein and a projection which extends into said cutout, a pair of threaded bolts, and a pair of mounting plates, each having a threaded aperture formed therein, each of said bolts threadably engaging the threaded aperture portion of one of said mounting plates with the upright portions of each of said bar end plates abutting against a respective one of said mounting plates such that when said bolts are tightened, the flat surfaces of said bracket end pieces are drawn against the bar upright portions, said bar being adjustable between a first raised position whereat the lights are held upright and a second lowered position whereat the lights are held substantially ninety degrees from said upright position, the projections of said bar end plates engaging the stop members of said bracket end plates when the bar is in the lowered position.

7. The assembly of claim 6 wherein the combined widths of the stop members of each of said brackets and each of the projections of said bar are such as to permit ninety degrees of rotation of said bar in either direction from the raised position of said bar.

8. The assembly of claim 7 and further including means for preventing said mounting plates from rotating as said bolts are tightened or loosened

* * * * *